(12) United States Patent
Kuchibhotla et al.

(10) Patent No.: US 10,095,501 B2
(45) Date of Patent: Oct. 9, 2018

(54) DEPLOYMENT AND ACTIVATION OF UPDATES ON TARGET HOSTS

(71) Applicant: Oracle International Corporation, Redwood Shores, CA (US)

(72) Inventors: Balasubrahmanyam Kuchibhotla, San Ramon, CA (US); Bharat Paliwal, Fremont, CA (US); Srivatsan Vijayaraghavan, Redwood Shores, CA (US); Shachi Sanklecha, Bangalore (IN); Abhishek Sureshkumar, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 143 days.

(21) Appl. No.: 14/660,679

(22) Filed: Mar. 17, 2015

(65) Prior Publication Data

US 2016/0092196 A1    Mar. 31, 2016

Related U.S. Application Data

(60) Provisional application No. 62/056,412, filed on Sep. 26, 2014.

(51) Int. Cl.
*G06F 9/44* (2018.01)
*G06F 8/65* (2018.01)
*G06F 9/445* (2018.01)

(52) U.S. Cl.
CPC ............ *G06F 8/65* (2013.01); *G06F 9/44552* (2013.01)

(58) Field of Classification Search
None
See application file for complete search history.

(56) References Cited

U.S. PATENT DOCUMENTS

| 7,036,121 | B1 | 4/2006 | Casabona et al. |
| 7,155,462 | B1 * | 12/2006 | Singh ........................ G06F 8/65 |
| | | | 707/695 |
| 7,213,232 | B1 | 5/2007 | Knowles |
| 7,458,073 | B1 | 11/2008 | Darling et al. |
| 7,624,377 | B2 | 11/2009 | Wu |
| 7,827,547 | B1 | 11/2010 | Sutherland et al. |
| 7,908,589 | B2 | 3/2011 | Sattler et al. |

(Continued)

OTHER PUBLICATIONS

Oracle, Creating and Configuring Oracle Virtual Directory Adapters, 2011.*

(Continued)

*Primary Examiner* — Insun Kang
(74) *Attorney, Agent, or Firm* — Invoke

(57) ABSTRACT

Techniques are described for managing updates across one or more targets using standard software images. In one embodiment, a first version of a software application is deployed on a set of one or more targets. A software binary is then generated for an updated version of the software application. The software binary for the updated version of the software application is deployed to the set of one or more targets. While the software binary for the updated version of the software application is deployed, the previous version of the software application remains active on a particular target. The updated version of the software application is activated, using the software binary, on the particular target.

20 Claims, 10 Drawing Sheets

(56) References Cited

U.S. PATENT DOCUMENTS

| | | | |
|---|---|---|---|
| 7,937,699 | B2 | 5/2011 | Schneider |
| 8,281,307 | B2 | 10/2012 | Arnold et al. |
| 8,347,263 | B1 | 1/2013 | Offer |
| 8,402,437 | B2 | 3/2013 | Dhanakshirur et al. |
| 8,490,054 | B2 | 7/2013 | Dattathreya |
| 8,667,465 | B2 | 3/2014 | Poole |
| 8,762,945 | B2 | 6/2014 | Arnold et al. |
| 9,032,388 | B1* | 5/2015 | Watson ............... G06F 21/30 717/170 |
| 2007/0169080 | A1 | 7/2007 | Friedman |
| 2008/0120479 | A1* | 5/2008 | Dick ................... G06F 8/00 711/154 |
| 2009/0064127 | A1 | 3/2009 | Schneider |
| 2009/0193057 | A1 | 7/2009 | Maes |
| 2009/0240791 | A1* | 9/2009 | Sakurai ............... G06F 8/65 709/221 |
| 2009/0265699 | A1* | 10/2009 | Toeroe ................ G06F 8/65 717/168 |
| 2011/0225275 | A1 | 9/2011 | Shah et al. |
| 2012/0311345 | A1* | 12/2012 | Dhuse ................. G06F 21/6218 713/189 |
| 2013/0054639 | A1 | 2/2013 | Sharma et al. |
| 2014/0173578 | A1* | 6/2014 | Ku ...................... G06F 8/65 717/169 |
| 2015/0113516 | A1 | 4/2015 | Bennah et al. |
| 2016/0267273 | A1* | 9/2016 | Sugawara ............ G06F 21/572 |

OTHER PUBLICATIONS

Ping et al., A Change-Oriented Conceptual Framework of Software Configuration Management, IEEE, pp. 1-4, dated 2007.

Faulkes et al., Software Configuration Management and Its Contribution to Reliability Program Management:, IEEE Transactions on Reliability, vol. R-32, No. 3, pp. 289-292, dated 1983.

U.S. Appl. No. 14/603,741, filed Jan. 23, 2015, Office Action, dated Jun. 19, 2015.

U.S. Appl. No. 14/603,741, filed Jan. 23, 2015, Notice of Allowance, dated Oct. 26, 2015.

U.S. Appl. No. 14/603,741, filed Jan. 23, 2015, Interview Summary, dated Sep. 22, 2015.

* cited by examiner

DEPLOYMENT AND ACTIVATION OF UPDATES ON TARGET HOSTS

CROSS-REFERENCE TO RELATED APPLICATIONS

This application claims the benefit of Provisional Appln. 62/056,412, filed Sep. 26, 2014, the entire contents of which is hereby incorporated by reference as if fully set forth herein, under 35 U.S.C. § 119(e).

This application is related to U.S. application Ser. No. 14/660,687, filed Mar. 17, 2015, entitled "Circular Buffer of Software Versions"; U.S. application Ser. No. 14/603,741, filed Jan. 23, 2015, entitled "Image Advisor"; U.S. application Ser. No. 14/603,764, filed Jan. 23, 2015, entitled "Populating Content for a Base Version of an Image"; U.S. application Ser. No. 14/603,775, filed Jan. 23, 2015, entitled "Creation of a Software Configuration Signature for Software"; U.S. application Ser. No. 14/603,532, filed Jan. 23, 2015, entitled "Version Management of Images"; and U.S. application Ser. No. 14/603,804, filed Jan. 23, 2015, entitled "Drift Management of Images"; and U.S. application Ser. No. 13/832,381, filed Mar. 15, 2013, the entire contents for each of which are hereby incorporated by reference as if fully set forth herein.

TECHNICAL FIELD

The present disclosure relates to updating deployed software resources. The disclosure relates more specifically to computer-implemented techniques for recommending, creating, and managing standardized configuration levels across different target software deployments.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many datacenters undergo two major types of transformations over time. First, a typical datacenter experiences significant growth with an ever increasing number of software deployments. Second, the software architecture within the datacenter is typically improved or updated with advancements in technology or changes to the underlying deployment models. These transformations frequently lead to software deployments that are siloed, dispersed, varied and complex. Some enterprise deployments have hundreds and thousands of software deployments across multiple versions and various software patch levels. The ever-increasing and divergent nature of software deployments within a datacenter may lead to significant challenges in updating and maintaining system resources.

One approach for updating software resources within a datacenter is to manage and apply patches individually on a per target software deployment basis. According to this approach, patches are applied separately at each respective target host. When applying newly available patches, the target software deployment is typically stopped to modify the underlying binary executable. Once the patches have been applied, the software deployment is restarted with the new updates. This approach provides for piecemeal updates within the datacenter. However, it may cause significant downtime for the target software deployments while the patches are being applied. Furthermore, this approach may cause difficulties in determining which targets should be updated and in standardizing updates across multiple targets, especially when the targets exist in a large and varied environment.

BRIEF DESCRIPTION OF THE DRAWINGS

Various embodiments are illustrated by way of example, and not by way of limitation, in the figures of the accompanying drawings and in which like reference numerals refer to similar elements and in which.

DETAILED DESCRIPTION

Figure 1:
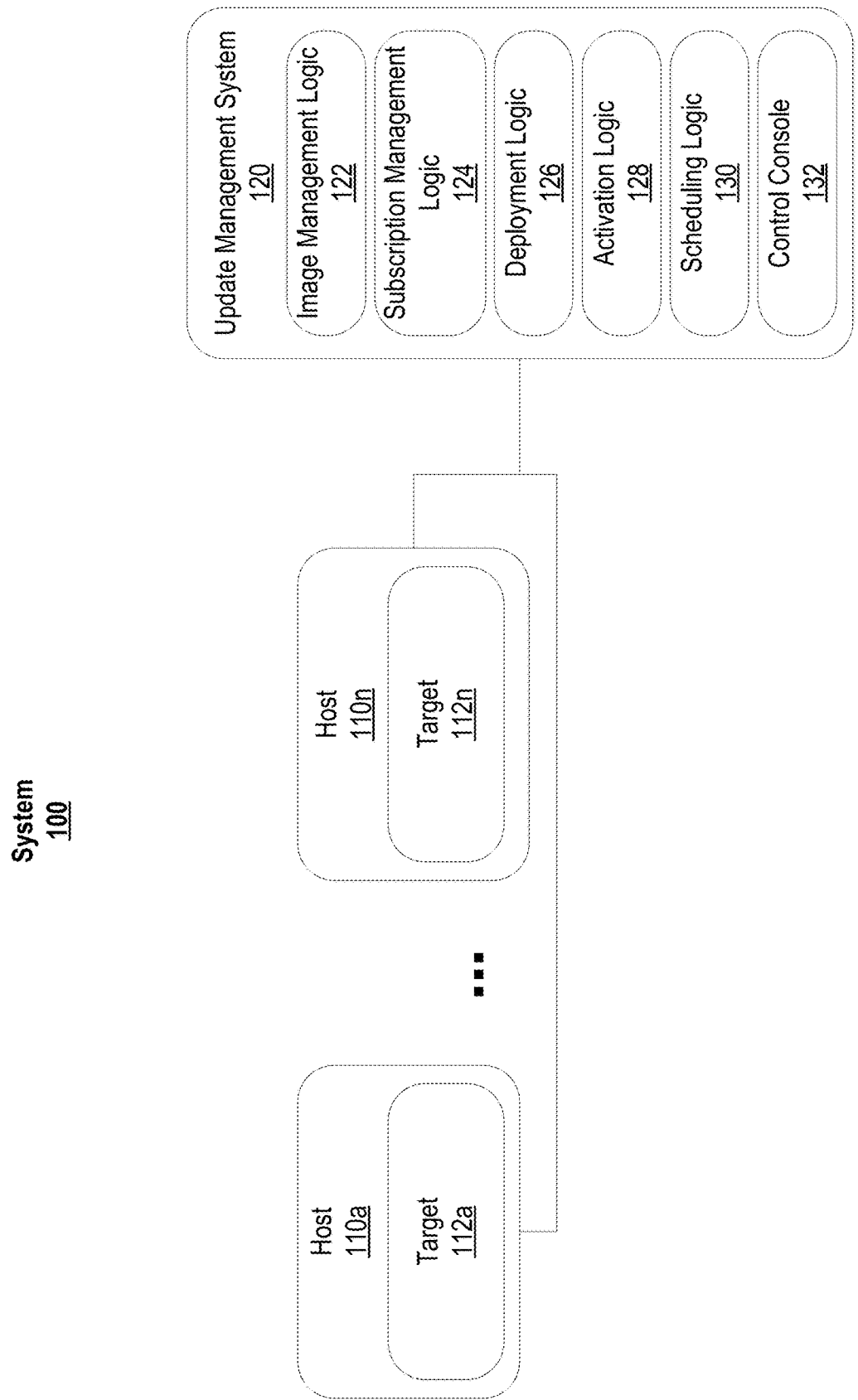
FIG. 1 illustrates an example system for updating deployed resources.

In the following description, for the purposes of explanation, numerous specific details are set forth in order to provide a thorough understanding of the disclosure. It will be apparent, however, that the present invention may be practiced without these specific details. In other instances, structures and devices are shown in block diagram form in order to avoid unnecessarily obscuring the present invention.

General Overview

In various embodiments, computer systems, stored instructions, and technical steps are described for managing software updates across multiple targets. Embodiments include an update process that maintains target availability and performs software updated with zero or minimal downtime. The update process further facilitates mass management of targets in large-scale environments, and allows for policy-driven approaches for deploying and activating new versions of software applications.

In one embodiment, the update process comprises generating a software binary for an updated version of a software application. The software binary may be generated by applying a set of one or more patches to a software binary for a previous version of the software application. At the time the software binary is created, a previous version of the software application may be deployed on a set of one or more targets. To update the set of targets, the software binary for the updated version of the software application is deployed to the set of one or more targets. While the software binary for the updated version of the software application is deployed, the previous version of the software application remains active on a particular target. After deployment of the software binary, the updated version of the software application is activated on the particular target, using the software binary. A software binary for the previous version of the software application is herein referred to as a "stale" software binary.

In another embodiment, a circular buffer of software versions may be maintained on a target host machine. As new versions of the software application are deployed, older versions are phased out and removed from the target home. The different versions of the software application may logically be presented as a single software unit for a given target or set of targets.

In one embodiment, a reference for a set of one or more target software deployments is maintained on a computing device. The reference may be a virtual software home, as described further herein, that is associated with a plurality of other software homes and versions of a software application. When an updated version of a software application is received, an older version of the software application is replaced with the updated version of the software application. After replacing the particular version of the software application with the updated version of the software application, the reference is associated with the updated version of the software application and not the particular version of the software application.

Update Management System

Techniques described herein may be implemented by an update management system that manages a software update process across multiple targets using standard software images. The update management system may support a variety of functions during the update process including, without limitation:

Publishing, to a set of targets, updates that were made to a standard software image that serves as a central point at which changes are applied;

Deploying updates to a set of targets without affecting the availability of the set of targets;

Activating updated versions of a software application for a set of targets with zero to minimal downtime of the set of targets; and/or Migrating a set of targets to the updated version of the software application.

FIG. 1 illustrates an example system for updating deployed resources, according to an embodiment. System 100 generally comprises hosts 110a to 110n and update management system 120. Components of system 100 may be implemented in one or more datacenters, one or more clouds, and/or one or more other networked environments.

Hosts 110a to 110n represent a set of one or more network hosts and generally comprise targets 112a to 112n. A "target" in this context refers to a software deployment, where a software deployment may include, without limitation, a set of one or more software applications such as system programs, development software, and/or other software systems that are deployed within system 100. Although only one target is illustrated per host, the number of targets per host may vary from implementation to implementation. For example, multiple targets may be deployed on a single host. Furthermore, in a clustered environment, a single target may logically be spread across a plurality of hosts.

Hosts 110a to 110n are communicatively coupled with update management system 120 and may send/receive messages according to one or more communication protocols. Example communication protocols that may be implemented include, without limitation, the hypertext transfer protocol (HTTP), secure shell (SSH), and/or other communication protocols of the internet protocol suite.

Update management system 120 manages various aspects relating to the update of targets 112a to 112n. Update management system 120 generally comprises image management logic 122, subscription management logic 124, deployment logic 126, activation logic 128, and scheduling logic 130. Each of these logic units supports a distinct set of functions involved in update process as described further below.

Update management system 120 may further comprise control console 132, which provides a user interface that allows a user to monitor and administer, locally or from a remote network location, the update processes described herein. The user interface may comprise, without limitation, a graphical user interface (GUI), an application programming interface (API), a command-line interface (CLI) or some other means of interacting with a user. A "user" in this context may include, without limitation, an application or a human user such as a system administrator.

Image Management

In one embodiment, update management system 120 maintains a set of one or more standard software images that drive the software update process. A "software image" in this context refers to a physical component for a set of one or more software applications that includes the payload for the set of one or more software applications. For example, a software image may comprise a binary large object (BLOB) or other physical binary component that stores binary executable code. A "software binary" or "executable code" in this context refers to encoded instructions and may include, without limitation machine code storing instructions native to a physical central processing unit (CPU) and/or interpretable code storing instructions that may be directly processed by an interpreter or other virtual machine.

Each software image may be associated with an end state definition. An "end-state definition", as used herein, refers to a logical definition of an image or image version. For example, the end-state definition may define the configuration level of the software image as a set of ordered attributes that identify the base software version plus the patches that have been applied.

Any software changes, also referred to herein as "patches", are introduced to the standard software images maintained by image management logic 122. For example, plug-ins, bug fixes, or other patches may be periodically released by the vendor or other provider of a software application or may be custom generated by a user. Applying such patches may include modifying the binary payload to update the executable instructions stored by the software image. When a patch is released, the corresponding end-state definition may also be updated by adding patch information that identifies the newly applied patches.

Figure 2:
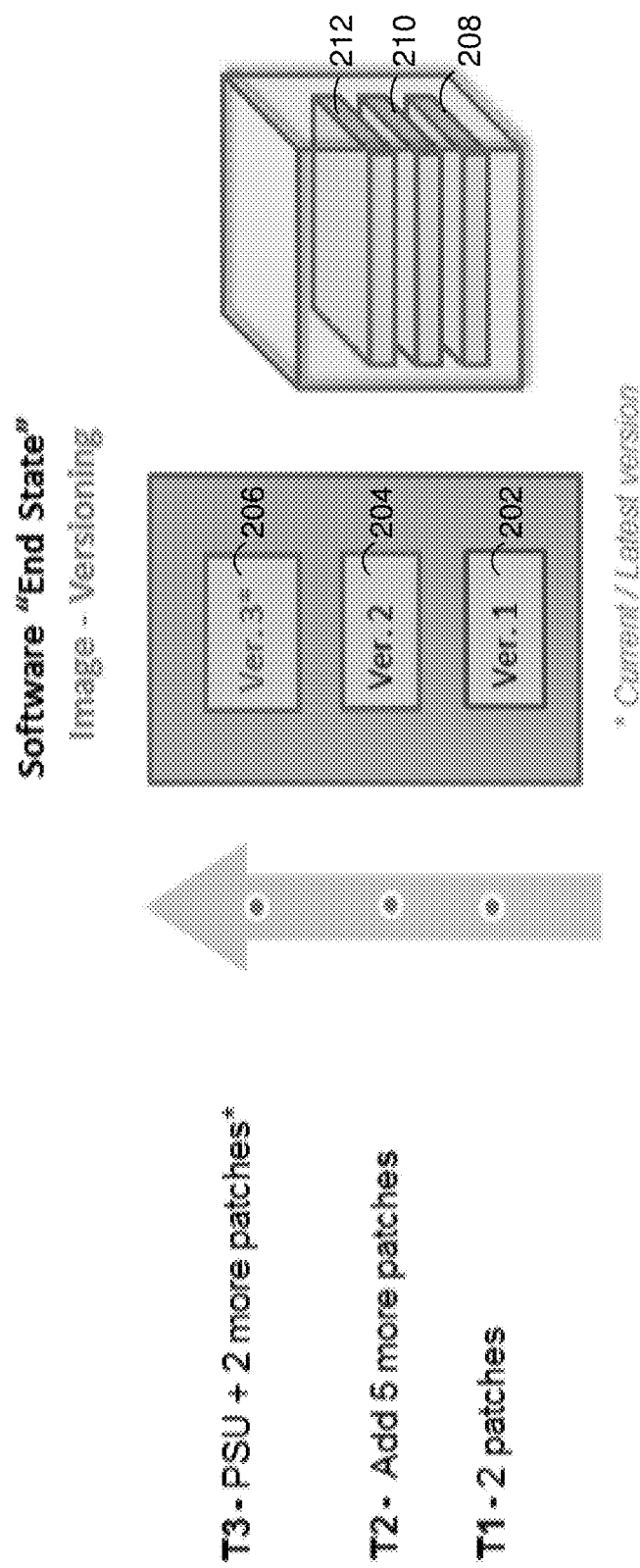
FIG. 2 illustrates updates to an end state definition and corresponding gold image as patches are released over time.

FIG. 2 illustrates updates to an end state definition and corresponding gold image as patches are released over time. Version 202 represents a first version of an end-state definition that was created at time T1. The first version of the end-state definition corresponds to the base version of a software application plus two patches applied on top. Image 208 is the gold image that matches the configuration level defined by version 202. At time T2, five more patches for the software application are released. Version 204 of the end state definition is created by updating version 202 to include the additional patches, and image 210 is created by applying the additional patches to image 208. At time T3, a PSU plus two more patches are released. Version 206 of the end state definition is created by adding the PSU and two patches to version 204 of the end state definition, and image 212 is created by applying the PSU and two additional patches to image 210. At time T3, version 206 represents the current/latest version of the end-state definition, and image 212 represents the current/latest version of the gold image.

Subscriber Updates

In one embodiment, a group of targets may subscribe to a software image to receive updates. A group of targets that subscribe to the same software image is herein referred to as a "flocking group". The software image to which members of the flocking group are subscribed is herein referred to as a "gold" or "standard" image. The gold image acts as the lead for the flocking group. As the gold image is being revised for changes, the subscribed targets follow the gold image to keep up with the latest software updates and versions. Thus, the gold image represents a standard software configuration level for the subscribed targets to follow.

Figure 3:
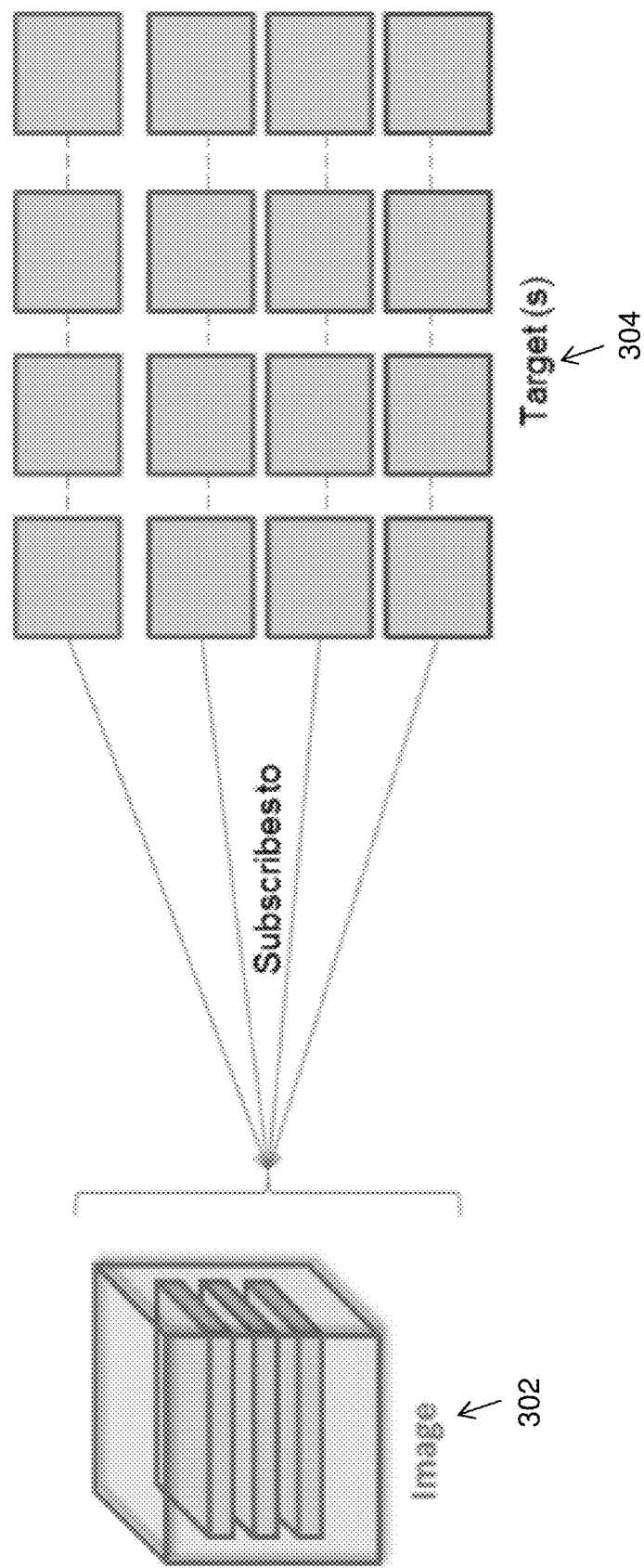
FIG. 3 illustrates targets that subscribe to an image and follow the updates to the latest versions available.

FIG. 3 illustrates targets that subscribe to an image and follow the updates to the latest versions available. Image 302 represents the end state definition for a particular release version of a software application that runs on a particular platform. Image 302 includes multiple versions of a gold image. Target(s) 304 represent one or more targets that are subscribed to image 302. As image 302 is updated, target(s) 304 follow the image such that the configuration of the targets matches the configuration of image 302. As patches are applied to image 302, the updated image is deployed to the subscribed targets as described further below.

In some cases, more than one gold image may be maintained for targets 112a to 112n. For example, there may be multiple flocking groups within a datacenter where each flocking group follows a different standard image. In such a scenario, each flocking group follows changes to the gold image to which they are subscribed, but does not follow changes to other gold images to which they are not subscribed. This approach allows multiple standards to be maintained across different groups of software deployments.

Figure 4:
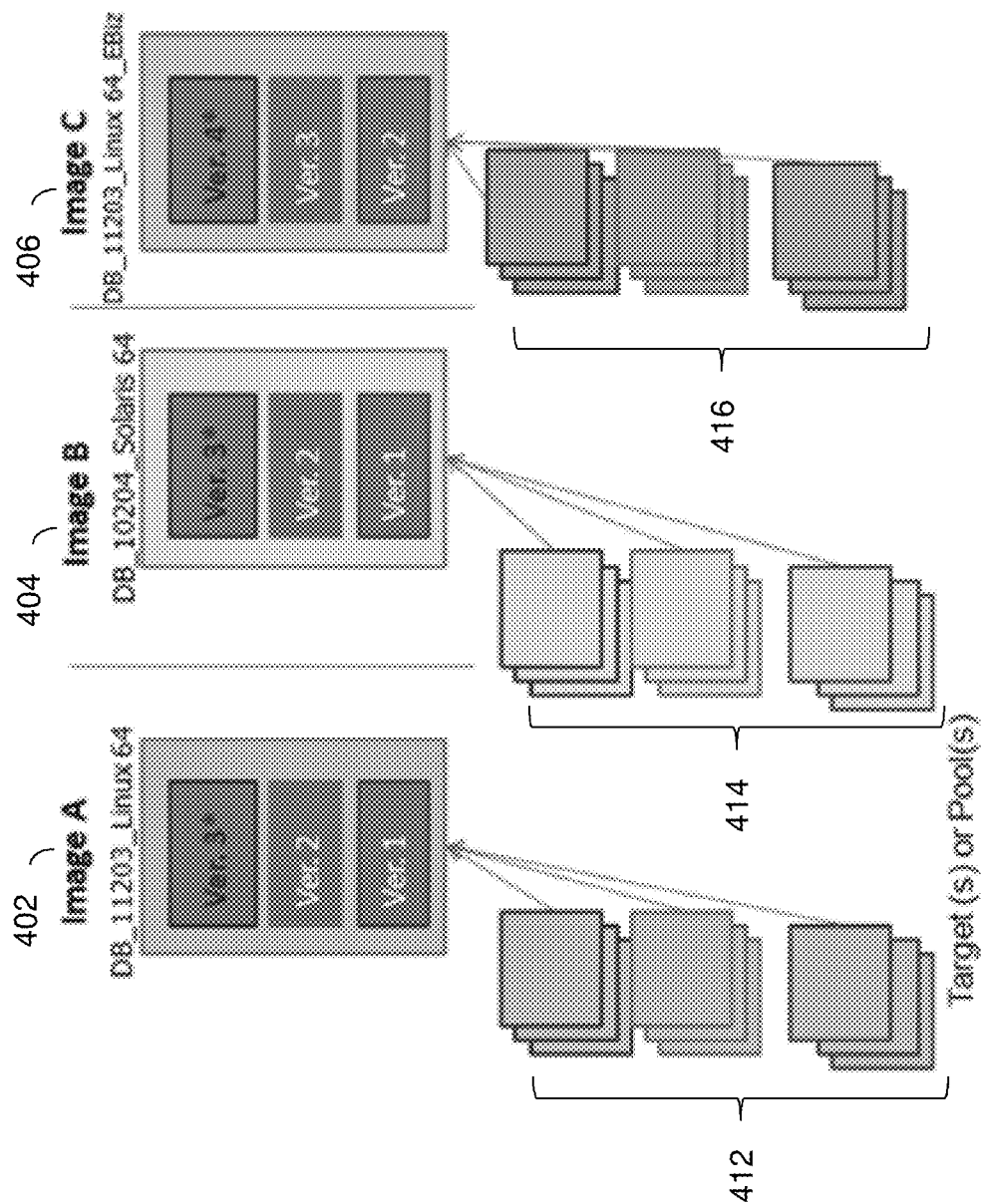
FIG. 4 illustrates an example datacenter environment where multiple gold images are maintained.

FIG. 4 illustrates an example datacenter environment where multiple gold images are maintained. Image 402 represents a gold image for a first flocking group, image 404 represents a gold image for a second flocking group, and image 406 represents a gold image for third flocking group. Target(s) 412 comprise one or more targets in the first flocking group that are subscribed to gold image 402, target(s) 414 comprise one or more targets in the second flocking group that and are subscribed to gold image 404, and target(s) 416 comprise one or more targets in the third flocking group that are subscribed to gold image 406. When image 402 is updated, a new version of the gold image is created. Target(s) 412 may then copy the image and incorporate the updates to follow the new version of the gold image. However, target(s) 414 and 416 do not follow the updates as they do not subscribe to image 402. Similarly, updates to image 404 propagated to target(s) 414, but not target(s) 412 and 416, and updates to image 406 are propagated to target(s) 416, but not target(s) 412 and 414.

Target Update Process

In one embodiment, a change to a gold image triggers a target update process for updating one or more subscribed targets. The update process generally includes a deployment phase, in which an updated version of a software application (or set of software applications) is deployed to the one or more subscribed targets, and an activation phase, in which the one or more subscribed targets are switched from a previous version of the software application to the updated version of the software application.

The update process allows for patches to be applied at a single standard software image without requiring patches to be applied at each of the updated targets. Once the patches have been applied, the updated software image may be copied to multiple subscribed targets without impacting the availability of those targets. The updated software image may then be activated on each of the subscribed targets with zero or minimal downtime as the patches do not need to be individually applied to each target.

Figure 5:
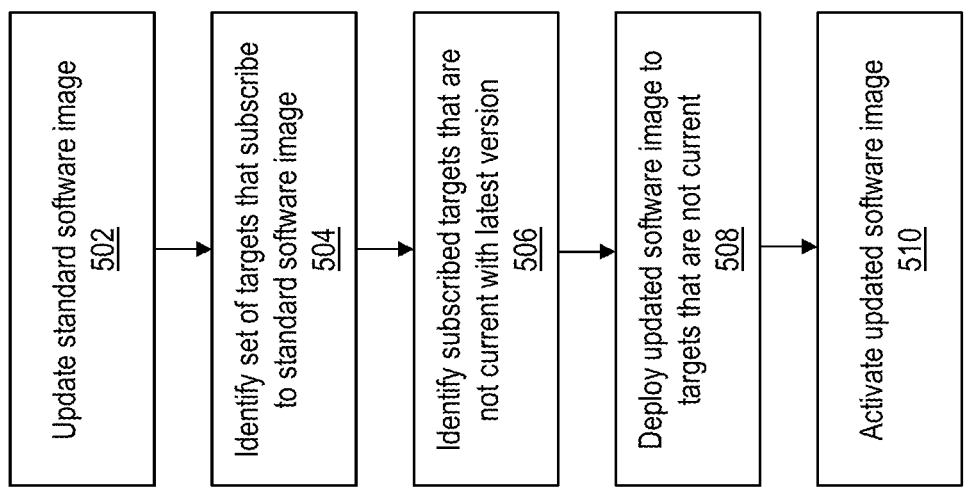
FIG. 5 illustrates an example process for updating a set of one or more targets. In step 502, a standard software image is updated.

FIG. 5 illustrates an example process for updating a set of one or more targets. In step 502, a standard software image is updated. As indicated above, updating the standard software image at this step may comprise applying patches to modify or replace the program executable of a software application and/or supporting data for the software application. Thus, the update to the standard software image may include a new version of a software application that is created by applying patches to a previous version of the software application.

In step 504, subscription management logic 124 identifies a set of one or more targets that subscribe to the standard software image. In one embodiment, subscription management logic 124 parses a set of subscription data to identify the set of one or more subscribed targets. The subscription data may be maintained by subscription management logic 124 and may map identifiers for each standard image to a set of one or more targets that subscribes to the respective standard image. Thus, for a given standard image, subscription management logic 124 may identify the flocking group that follows the image.

In step 506, deployment logic 126 determines which of the set one or more subscribed targets to update. During this step, deployment logic 126 may analyze each of the subscribed target's software configuration level to determine a list of members that are not running the latest version of the software application. If a target already is running the latest version, then the target may be omitted from the update process.

In step 508, deployment logic 126 deploys the updated software image to the subscribed targets that are not current with the latest version. During this step, deployment logic 126 may transfer the updated software image directly to the subscribed targets, or the subscribed targets may download or otherwise pull the updated software image from update management system 120. While the updated version of an image/software application is being copied to a target, an older version of the software application may remain active and running at the target. Thus, deploying the updated software image does not impact the subscribed target's availability.

In step 510, activation logic 128 activates the updated version of the software application at the subscribed targets. In order to activate the updated version of the software application, the target may be stopped, switched to the updated version of the software application, and brought back up as an instance (or set of instances) of the new version of the application.

Deployment Phase: Shadow Home Creation

During the deployment phase, a shadow home may be created to deploy an updated software image for a set of one or more subscribed targets. A "shadow home" in this context refers to a directory, link to a directory, or some other reference to a storage location where program files from the software image are extracted and installed. The shadow home may be associated with program files and/or other program components for an inactive version of a software application and may coexist with an "active home", which includes program files and/or other program components for an active version of the software application. A version of a software application that is associated with a shadow home is herein referred to as a "shadow version" or "shadow copy" of the software application.

When creating a shadow home, a set of software components may be extracted from the deployed software image and installed at a storage location referenced by the shadow home. For example, the software image may comprise an archive file from which software libraries, structured query language (SQL) files, configuration files, software binaries, and/or other software application files may be extracted. These software components remain inactive until the activation phase of the update process.

Virtual Home

As indicated above, a shadow home may coexist with an active home for a given target or set of targets. In one embodiment, the shadow home and the active home are associated with the same virtual home. The virtual home logically presents both the active home and the shadow home, including the different software versions contained therein, as the same software unit. Thus, management and maintenance functions performed to the virtual home may be performed to both the underlying active home and shadow home. For example, removing the virtual home may cause the active version of the software and the shadow copy of the software to be uninstalled. Similarly, updating application data, such as application preferences, may be applied for both the active home and the shadow home.

Figure 6:
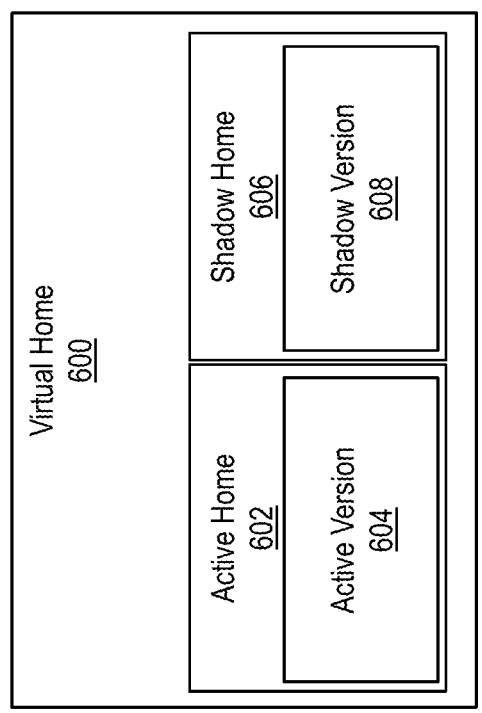
FIG. 6 illustrates an example virtual home that includes references for an active version of a software application and an inactive version of the software application.

FIG. 6 illustrates an example virtual home that includes references for an active version of a software application and an inactive version of the software application. Virtual home 600 includes a link to active home 602 and shadow home 606. Active home 602 is a directory or link to a directory that contains files for application version 604, which represents an active version for the target software deployment. Shadow home 606 is a directory or link to a directory that contains files for application version 608, which represents an inactive version for the target software deployment.

A shadow home and shadow software copy may be hidden from a user. For example, although virtual home 600 references both active home 602 and shadow home 606, a user may be restricted to viewing and accessing active home 602. Once shadow home 606 becomes active, then the user may be permitted to view and access the home. A shadow home that is hidden from a user is herein referred to as a "ghost home".

Shared Virtual Homes

In some cases, multiple targets may share a virtual home. In the context of a database, for example, a software home and a single copy of a database management system software may support a plurality of target databases. In such a scenario, a single shadow home may be created during the deployment phase to support a plurality of targets that share a virtual home.

When multiple targets share a virtual home, different targets may run on different software homes. For example, a first set of one or more targets may run on a first version of the software application contained within the virtual home while a second set of one or more targets may run on a second version of the software application contained within the virtual home. Similarly, there may be additional sets of targets running on additional versions of the software application, depending on the particular implementation. In such scenarios, a software home may serve as the active home for one set of targets and a shadow home for another set of targets. The software home is the active home for a set of targets if the set of targets are running on the software copy contained therein and is a shadow home for a set of targets if the set of targets are running on a software copy in a different software home that is associated with the same virtual home.

Figure 7:
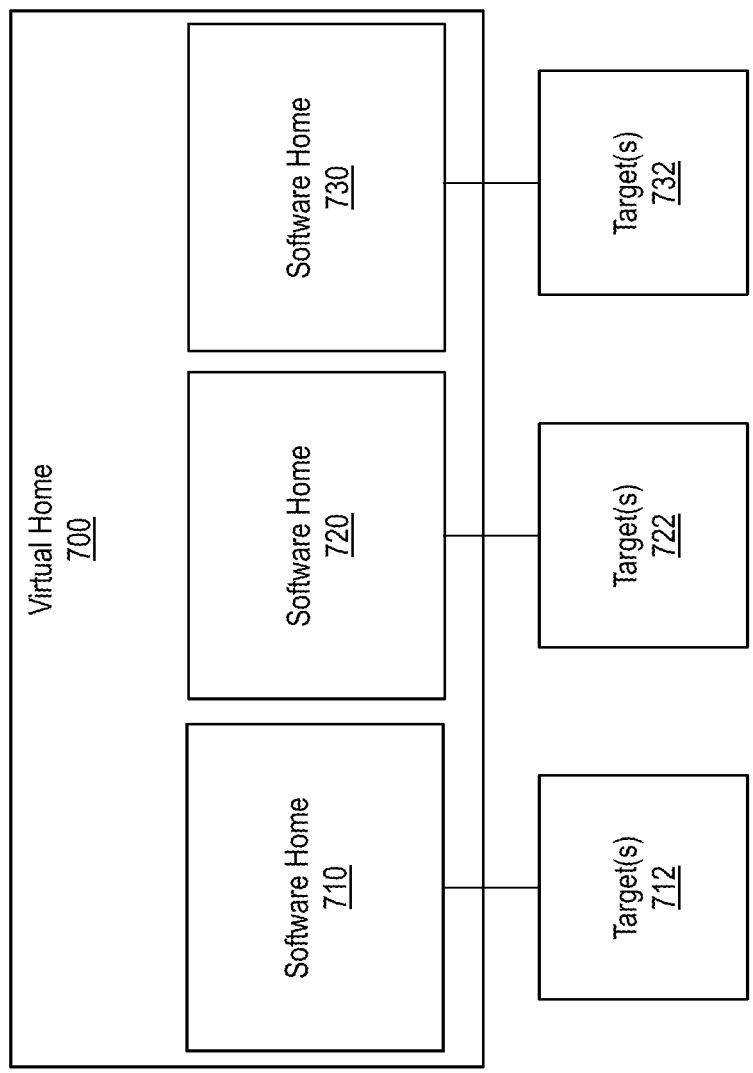
FIG. 7 illustrates an example environment in which targets are run from different software copies within a virtual home.

FIG. 7 illustrates an example environment in which targets are run from different software copies within a virtual home. Virtual home 700 includes software homes 710, 720, and 730. Software home 710 is the active home for targets 712 and a shadow home for targets 722 and 732. Similarly, software home 720 is the active home for targets 722 and a shadow home for targets 712 and 732, and software home 730 is the active home for targets 732 and a shadow home for targets 712 and 722. Each of targets 712, 722, and 732 run on different versions of a software application contained in software homes 720, 730, and 740, respectively.

Clustered Deployments

In clustered environments, a virtual home for a target software deployment may be copied to multiple target hosts, also referred to as "cluster nodes". In such a scenario, deployment logic 126 may deploy shadow homes to each cluster node for the target software deployment. Updates to one cluster node may mirror updates to another cluster node. Thus, the changes to one cluster node may be synchronized with one or more other cluster nodes.

Activation Phase: Swap Method Versus Switch Method

During the activation phase, the version of a software application running for a given target is updated to a shadow version that was copied to a target host during the deploy phase. The currently active version is shutdown on the target, thereby becoming inactive. The shadow version that was not previously active on the target may then be started, becoming the active software copy for the target. The activation process may be performed using a swap method or a switch method as described further below.

In the swap method, the path of the software application remains unchanged before and after activation. After the target is stopped, the software binary for the first version of the software application is swapped out with the software binary for the second version of the software application. For example, active home 602 may be copied to a new location, and shadow home 606, which contains an updated software binary for the second version of the application, may assume the path previously used by the first version of the software application.

In the switch method, the path for the target software deployment is changed during the activation process. Activation occurs by switching or migrating the target from the active home to a shadow home. Post processing steps may be performed to update path-dependent target properties within update management system 120. One advantage of switch method over swap is, in a consolidated environment, the switch method provides flexibility in activating the new version of a software application for only a selected target or set of targets even when multiple targets share the same software copy.

Activation Phase: Configuration Actions

In some cases, configuration actions may be performed for a particular application version during the activation phase. Performing a configuration action may comprise executing a series of scripts or other logic that modifies supporting data or data structures used by the software application. In the context of a database, for example, a configuration action may be run from a set of SQL scripts to modify dictionary tables, database metadata, and/or other system objects.

Upon activation, a software application may compute the list of configuration actions to perform based on the patches included in the image version and deployed to the target. For example, configuration scripts may be stored in a shadow home when an update image is deployed to a target. The software application may access and run these configuration scripts once the updated application version is activated for a given target.

Private Version-Generic Data

In some embodiments, the update process may be performed without affecting private, version-generic data associated with the software application. Private, version-generic data may comprise user-generated content that is not dependent on which version of the software application is being executed. In the context of a database system, for example, this data may include, without limitation, user-defined tables, views, and/or other database objects. In other contexts, such private data may include, without limitation, files that contain content generated by a user through the use of the software application.

During the deployment phase, deployment logic 126 may deploy the new version of a software image by copying the updated software binary without replicating, changing, or otherwise accessing private data generated through previous versions of the software application. In the activation phase, the private data may similarly remain unchanged. Upon activation, the new version of the software application may access the same private data that was used by the previous version of the software application. For example, a database server running in an updated version of a database management system may access the same database objects as a previous version of the database management system without any replication of the database objects occurring between the different versions of the database management system.

Circular Buffer of Software Versions

In one embodiment, a virtual home acts as a circular buffer for different versions of a software application. At any given point in time, there may be one or more shadow copies of a software application, and one or more active versions within a virtual home. As new versions of the software application are deployed, previous versions of the software application are phased out and removed or otherwise discarded from the virtual home.

When acting as a circular buffer the virtual home may be associated with a threshold number of software homes, including active and shadow homes. The threshold may vary from implementation, and may be based on a strike policy as described in further detail below. Once the threshold has been reached, newly created shadow homes may replace older shadow homes within the virtual home.

Figure 8:
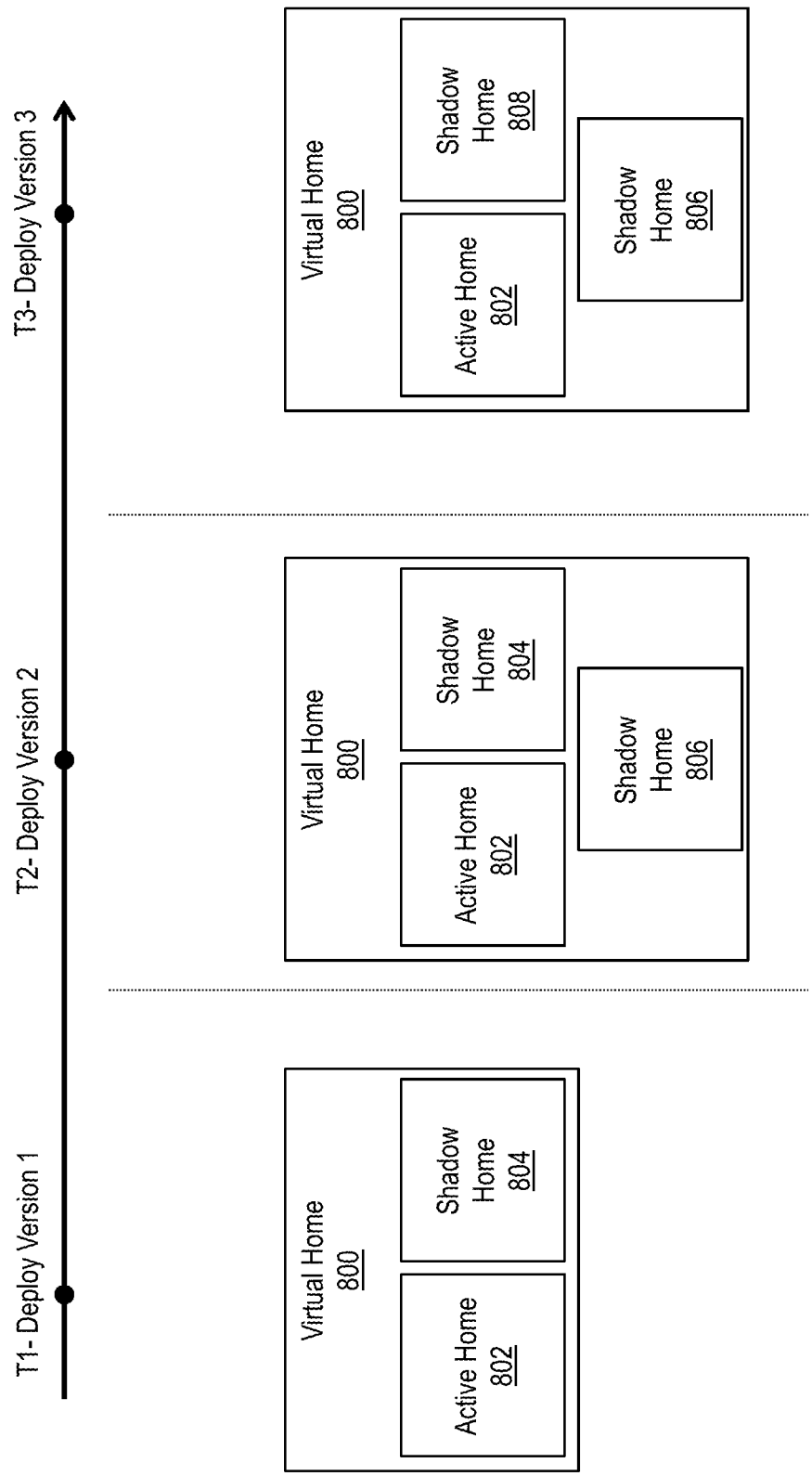
FIG. 8 illustrates an example approach for deploying new versions of a software application.

FIG. 8 illustrates an example approach for deploying new versions of a software application. In the example given, virtual home 800 has a threshold of three containers for holding different software homes, although the threshold may vary as previously indicated. At time T1, virtual home 800 includes active home 802 and shadow home 804. At time T2, an updated software image is deployed, and shadow home 806 is created. As the threshold has not been exceeded, shadow home 806 may be added to virtual home without removing active home 802 or shadow home 804. At time T3, another updated software image is deployed, and shadow home 808 is created. The new deployment causes the threshold to be exceeded, and shadow home 804 is replaced with shadow home 808. Thus, at time T3, virtual home references active home 802, shadow home 806, and shadow home 808, but not shadow home 804. Shadow home 804 may further be removed from the target host machine.

Strike Policies

In one embodiment, a strike policy may be defined for an individual target or for a group of targets. A strike policy specifies the threshold number of software versions supported by the target or group of targets. A "Strike-N" policy, as used herein, refers to a strike policy that constrains a target, set of targets, and/or a virtual home to N software versions. Thus, a strike-2 policy refers to a policy that constrains one or more targets to two software copies (e.g., one active version and one shadow version) for a software application. Similarly, a strike-4 policy may constrain a target to four different software copies (e.g., one active version and three shadow versions).

A strike policy's threshold value may be exposed to an administrator or other user as a configurable attribute. Thus, the user may adjust and define the constraint on how many software versions a target or group of targets may support. Generally, as the threshold increases, the number of deployed software images for a given target or set of targets also increases. A larger threshold allows for greater flexibility in switching between different versions of a software application and staggering target activations, but may result in greater consumption of storage resources to store multiple software binaries for the different versions.

Phasing Out Older Software Versions

As indicated above, older versions of a software application may be phased out and removed from target hosts as newer versions are deployed. The determination of which software version to phase out may generally be based on the ages of the different software versions. In one embodiment, the oldest shadow version of the software application is phased out. For example, active home 802 may contain a software version that is older than shadow home 804. However, as active home 802 contains an active software version, the active home is not replaced by shadow home 808. Rather, shadow home 808 replaces the oldest shadow software version, which in the present example is shadow home 804.

In another embodiment, the oldest version of the software application is phased out regardless of whether it is an active or shadow copy. If the oldest version is an active copy, then any targets running on the active home are migrated to a more current home, and the previously active version is removed from the target. For example, if active home 802 is older than shadow home 804, then shadow home 804 may be activated, and active home 802 phased out. In such a scenario, shadow home 808 would replace active home 802 rather than shadow home 804.

Rollback to Older Software Versions

After the activation phase is complete, the previously active copy of a software application may become a shadow copy within a virtual home. In some cases, a user may wish to rollback to the previously active version of the software. For example, an updated software version may contain bugs or cause other unanticipated issues that were not present in an older software version. In such a scenario, a target may be rolled back to a previous software version.

In order to rollback a target, the target may be stopped and the previously active version of the software application may be reactivated. Upon rollback, the updated version of the software application may be deactivated and reside as a shadow copy on the target host or may be uninstalled from the target host.

During rollback, a shadow home that previously served as the active home assumes the role of active home again. For example, if active home 802 contains the most recent version of a software application at time T1, the software may be rolled back to the versions contained by shadow home 804 or shadow home 806. Rolling back causes one of shadow homes 804 or 806 to replace active home 802 as the currently active home directory for a given target or set of targets.

Staggered Activation Across Multiple Targets

The target update process described above allows for mass deployment of updated software images across multiple targets while at the same time allowing targets to stagger activation of the updated software copy. For example, at time T1, an updated software image may be deployed to all members of a flocking group. At time T2, a first set of one or more targets within a flocking group may activate a new version of a software application while a second set of one or more targets remain on an older version of the software application. Targets within the second set may activate the new version of the software application at one or more subsequent points in time.

Staggering the activation of targets allows for greater flexibility in the update process. For example, the peak workload hours for targets within the same flocking group may vary. In some cases, a target in a datacenter at a first location has a peak workload during a first window of time, while a target at a datacenter at a different location has a peak workload during a second window of time. Thus, staggering updates between the two targets may avoid downtime during peak hour. Each respective target may instead be updated to the new standard at a time that is convenient for the respective target.

Targets that share the same virtual home and software copy may also be updated at different times. For example, when a new shadow home is deployed, a first subset of targets that share a virtual home may be switched to the new shadow home while a second subset remain on one or more older versions of the software application. This approach allows the update flexibility described above for targets that share the same copy of a software application.

Policy Driven Update Management

As indicated above, the target update process allows targets to delay activating an updated version of a software application. Allowing the flexibility to delay an update also presents a risk that a target may fall farther and farther behind the most current gold image. In order to prevent a target from falling too far behind, policies may be maintained that specify one or more conditions under which a target is compelled to update to a more recent version of the software application.

The conditions under which a target is compelled to update may vary from implementation to implementation. In one embodiment, a policy may specify a condition in terms of a threshold number of image updates from which the target may diverge. If the target falls behind the threshold number of updates, then the target may be compelled to update to a newer version of the software application. For example, update management system 120 may allow a target to fall behind a standard gold image by up to two versions. In such a scenario, two different versions of a gold image may be deployed to a target without activating the updated versions on the target. After a third version of the gold image is deployed, if the target still has not been updated to either of the previous two versions, then activation logic 128 may activate the latest version of the software application.

In another embodiment, a policy may specify a time constraint for which the target is allowed to operate on an older version of the software application. If a threshold time lapses, then the target may be compelled to update to a more recent version of the software application. For example, the policy may give a target a threshold number of months in which the target may update to a new standard. After the threshold number of months has passed, update management system 120 may determine whether the target has updated to the latest gold image standard. If not, then activation logic 128 may activate the latest version of the software application on the target.

In another embodiment, a policy may restrict rollback to previous versions of a software application. As an example, the policy may define a time period during which targets may rollback to an older shadow version of an application. Once the time period has lapsed, then update management system 120 may prevent targets from rolling back to that version of the application. Such a policy allows update management system 120 to archive, remove, and/or perform other cleanup activities with respect to older gold image versions.

In another embodiment, a policy may constrain new targets to the most current version of the software application. For example, if a new target is added to a flocking group, update management system 120 may determine the configuration level of the new target. If the new target does match the configuration level of the most recent gold image, update management system 120 may compel the target to update to the latest version. Compelling the target to update in this context may involve deploying the most recent gold image, stopping the new target, and/or switching the target to the latest version of the software application.

State Transitions for Software Homes

Software homes within a virtual home may transition between different states during their lifecycle. These states may include, without limitation:

Passive home: When a latest version of a software application is deployed on a target host, a passive home is generated. The latest version remains passive until the passive home is activated. Activation may be performed by an administrator or other user.

Active: current home: When the latest version of a software application is activated, the passive home transitions to this state. New targets (such as databases) or targets running on older versions of the software application may then be moved and/or run from this home. The previous active: current home is pushed from this state.

Active: obsolete home: This state refers to a home from which one or more database instances (or other application instances) are running. However, these homes are no longer the latest versions. New target software deployments may be prevented from using these homes. If a policy permits, a target running on a later version of the software application may be rolled back to run from this home.

Retired home: When all instances of the target deployment(s) are moved out of an active obsolete home, and if a policy no longer permits a rollback, the home becomes inactive and retired. The retired home and the software files it contains may be removed from the target host.

Scheduled Maintenance Management

In one embodiment, scheduling logic 130 manages scheduled maintenance windows for targets within a flocking group. A "maintenance window" in this context refers to a window of time during which a deployed software version may be activated on a target. Within a maintenance window, there may be a plurality of time slots. Each "time slot"

within a maintenance window is a smaller window of time that may be reserved to update a specific target or a specific set of targets.

Figure 9:
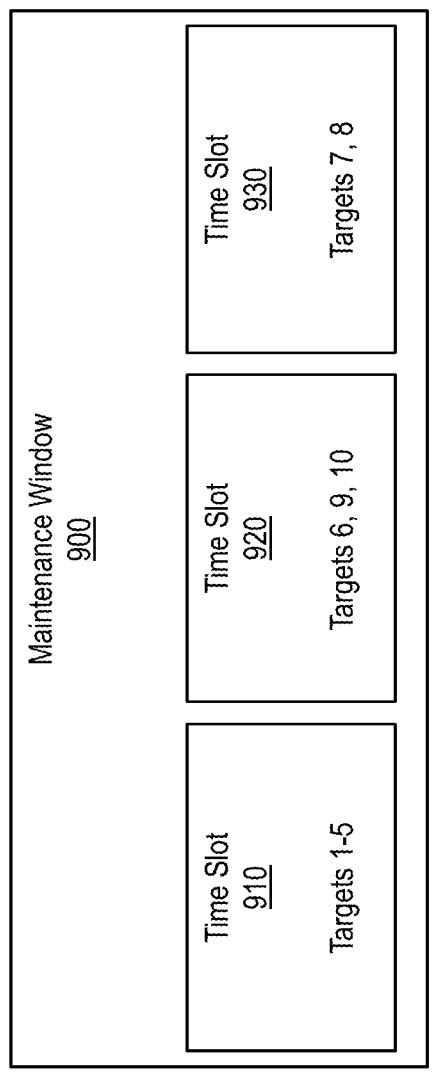
FIG. 9 illustrates an example maintenance window for scheduling target updates.

In one embodiment, scheduling logic 130 publishes a scheduled maintenance window to targets within a flocking group. The targets may be registered with specific time slots within the maintenance window. As an example, FIG. 9 illustrates a maintenance window for scheduling target updates. Maintenance window 900 includes time slots 910, 920, and 930. Within each of time slots 910, 920, and 930, one or more targets are scheduled to be switched to an updated version of the software application. Once the scheduled time corresponding to time slot 910 arrives, the new version of the application is activated on each target registered at slot 910. The next scheduled time corresponding to time slot 920 triggers activation on the targets registered at slot 920, and the next scheduled time corresponding to time slot 930 triggers activation of the targets registered at slot 930.

The responsibility for registering a target with a time slot may vary depending on the particular implementation. In an "opt-in" scenario, administrators for individual targets or sets of targets may be responsible for registering with a specific time slot. The target or set of targets may then submit a registration request to scheduling logic 130 and, in response, scheduling logic 130 may register the targets with the requested time slot. The opt-in approach allows database and other target administrators to control when the activation phase occurs to prevent any downtime or other issues at inconvenient times. If the target administrator does not want to be responsible for scheduling the update, the target administrator may optionally delegate the responsibility back to update management system 120 or a system-wide administrator. In such a case, scheduling logic 130 may automatically register the target with a time slot.

In an "opt-out" approach, update management system 120 is responsible for scheduling activation of the deployed software images on the targets. Scheduling logic 120 may automatically schedule the targets within a flocking group at a particular time slot. A target may opt out to change time slots or to remove itself from the maintenance window.

Within a time slot, the targets may be updated in parallel or sequentially, depending on the particular implementation. In one embodiment, update management system 120 controls the sequence of activation based on the compute resources on each target host. Update management system 120 may form sets of targets for parallel updates for a given time slot. For example, if target 1 is on the same host as target 3, and target 4 is on the same host as target 5, two sets of targets may be formed for time slot 910 to distribute the load on each host. The first set may comprise targets 1, 3, 5, and the second set may comprise targets 2, 4. Update management system may trigger parallel update of targets 1, 3, and 5. Once the update for target 1 is complete, the activation process may be performed on target 2, and once the update of target 3 is complete, the activation process may be performed on target 4. This distributes the number of targets that are updated at a given time on a single host machine, thereby conserving compute resources.

For clustered environments, the activation process may be distributed across different representative host machines. For example, a first target may have instances running on both a first host machine and a second host machine within the clustered environment. Similarly, a second target may have instances running on both the first host machine and the second host machine. To allow for greater parallelization during the activation process, the first or second host machine may be selected as a representative machine for the first target, and the remaining host machine may be selected as the representative machine for the second target.

Update Prevention Policies

In one embodiment, a policy may be established under which scheduled target updates may be stopped. The policy may be based on feedback received by update management system 120 during the scheduled maintenance of the targets. If activation of a new software version is unsuccessful for a threshold number of targets at a particular time slot, then update management system 120 may prevent activation from occurring at a future time slot. An activation may be deemed unsuccessful if it causes operational errors or other failures on the target.

As an example, the targets registered at time slot 910 may be updated at time T1. If activation is unsuccessful for a threshold percentage of the targets, then update management system 120 may prevent activation for targets registered with time slots 920 and 930 at the scheduled times. If activation is successful for the threshold percentage of targets, then activation may proceed with time slot 920. The same analysis may be performed with respect to time slot 920 to determine whether to proceed with activation at time slot 930.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
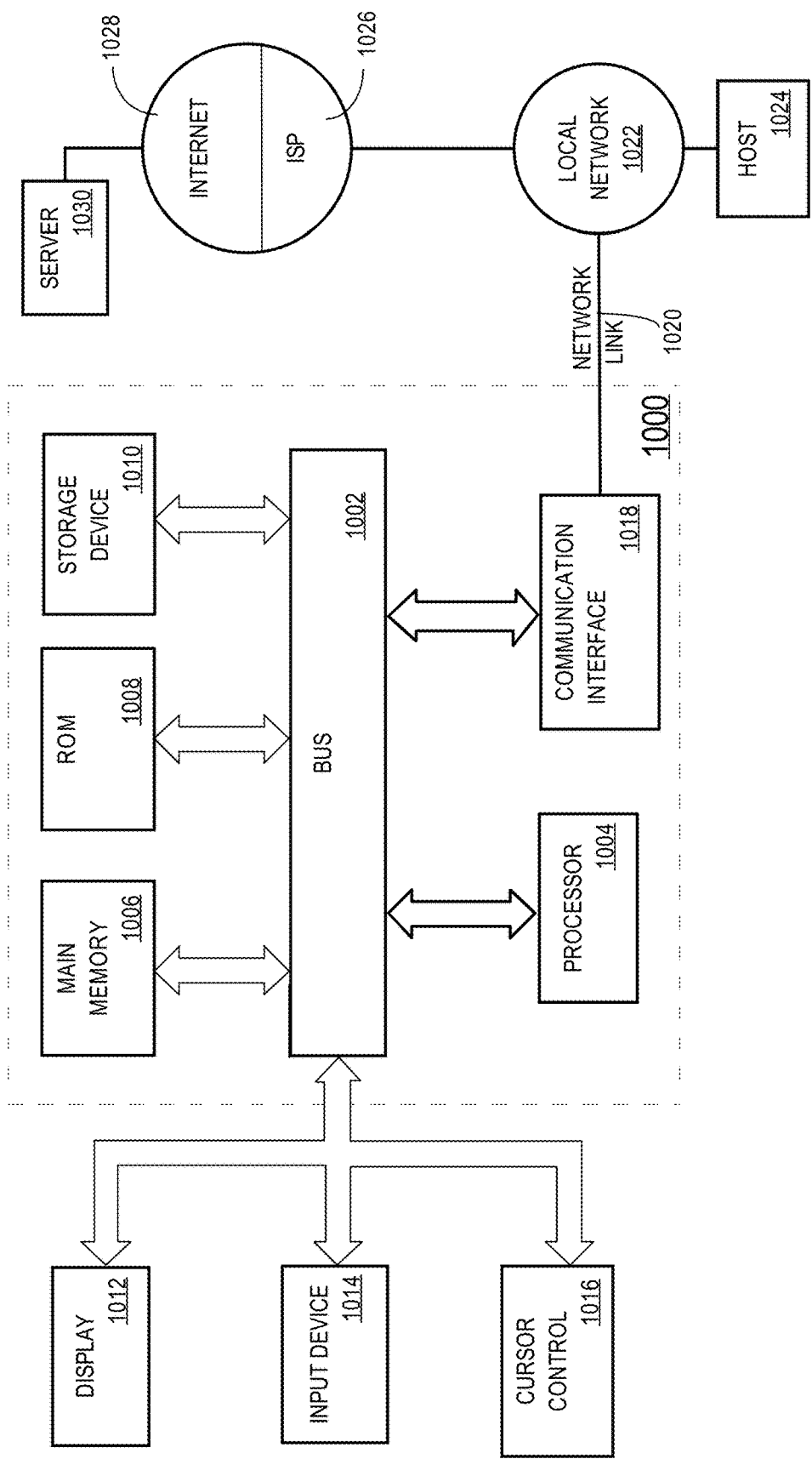
FIG. 10 is a block diagram that illustrates a computer system upon which an embodiment may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a liquid-crystal display (LCD) or a light-emitting diode (LED) display, for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "logic" as used herein includes computer or electrical hardware component(s), firmware, a non-transitory computer readable medium that stores instructions, and/or combinations of these components configured to perform one or more functions or actions, and/or to cause one or more functions or actions from another logic, method, and/or system. Logic may include am microprocessor controlled by executable code, a discrete logic (e.g, ASIC), an analog circuit, a digital circuit, a programmed logic device, a memory device containing instructions that when executed perform an algorithm, and so on. Logic may include one or more gates, combinations of gates, or other circuit components. Where multiple logic units are described, it may be possible to incorporate the multiple logic units into one physical logic component. Similarly, where a single logic unit is described, it may be possible to distribute the single logic unit between multiple physical logic components.

The term "storage media" as used herein refers to any non-transitory media that store data and/or instructions that cause a machine to operate in a specific fashion. Such storage media may comprise non-volatile media and/or volatile media. Non-volatile media includes, for example, optical disks or magnetic disks, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

Cloud Computing Overview

The techniques described herein are implemented using one or more processing solutions, examples of which include distributed systems, clustered computing systems, and cloud computing systems. In an embodiment, system 100 is part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In this embodiment, any part (or the whole of) the functionality attributed to system 100, or to other entities within this description, is controllable via an interface that is exposed at a cloud computing system.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
generating an updated software binary for an updated version of a software application that uses a virtual container as an executable directory;
wherein a previous version of the software application is deployed on a plurality of targets;
wherein the previous version of the software application runs from a first set of components in a first container referenced by the virtual container;
loading the updated software binary for the updated version of the software application to a second container that is referenced by the virtual container;
wherein the previous version of the software application remains active on the plurality of targets while the updated software binary for the updated version of the software application is loaded to the second container that is referenced by the virtual container;
wherein the virtual container is manageable as a single software unit representative of the software application that uses the virtual container as an executable directory, the virtual container defining a path for running the software application from the first set of components in the first container; and
activating the updated version of the software application on a first subset of one or more targets of the plurality of targets by changing the path defined by the virtual container to run at least one deployment of the software application from a second set of source components in the second container;
wherein after changing the path defined by the virtual container, at least one deployment of the software application on a second subset of one or more targets of the plurality of targets continue to run from the first set of components in the first container.

2. The method of claim 1,
wherein generating the updated software binary for the updated version of the software application comprises applying a set of patches to the previous version of the software application;
the method further comprising loading the updated software binary for the updated version of the software application to a plurality of virtual containers.

3. The method of claim 1,
wherein the updated version of the software application is activated on a particular target in the first subset of one or more targets without copying private data created by the previous version of the software application; and
wherein the updated version of the software application uses the private data upon activation.

4. The method of claim 1,
further comprising:
after activating the updated version of the software application on the first subset of one or more targets of the plurality of targets, activating the updated version of the software application on the second subset of one or more targets of the plurality of targets.

5. The method of claim 1, further comprising:
maintaining a maintenance window comprising a plurality of time slots;
for each respective time slot of two or more time slots of the plurality of time slots, registering at least one target from the plurality of targets with the respective time slot;
wherein the updated version of the software application is activated on the at least one target at a time corresponding to the respective time slot with which the at least one target is registered.

6. The method of claim 1, further comprising:
activating the updated version of the software application on the first subset of one or more targets at a first scheduled time;
in response to determining that activation of the updated version of the software application was unsuccessful for a threshold number of targets in the first subset of one or more targets, preventing activation of the updated version of the software application on the second subset of one or more targets at a second scheduled time.

7. The method of claim 1, wherein activating the updated version of the software application on the first subset of one or more targets is performed in response to at least one of (a) a determination that at least one particular target has fallen behind a standard version of the software application by a threshold number of updates; or (b) a determination that a threshold time has passed for switching to the updated version of the software application.

8. The method of claim 1, wherein activating the updated version of the software application on the first subset of one or more targets comprises replacing a second software binary for the previous version of the software application with the updated software binary for the updated version of the software application and running a configuration action on the first subset of one or more targets.

9. One or more non-transitory computer-readable media storing instructions which, when executed by one or more processors, cause operations comprising:
generating an updated software binary for an updated version of a software application that uses a virtual container as an executable directory;
wherein a previous version of the software application is deployed on a plurality of targets;
wherein the previous version of the software application runs from a first set of components in a first container referenced by the virtual container;
loading the updated software binary for the updated version of the software application to a second container that is referenced by the virtual container;
wherein the previous version of the software application remains active on the plurality of targets while the updated software binary for the updated version of the software application is loaded to the second container that is referenced by the virtual container;
wherein the virtual container is manageable as a single software unit representative of the software application that uses the virtual container as an executable directory, the virtual container defining a path for running the software application from the first set of components in the first container; and
activating the updated version of the software application on a first subset of one or more targets of the plurality of targets by changing the path defined by the virtual container to run at least one deployment of the software application from a second set of source components in the second container;
wherein after changing the path defined by the virtual container, at least one deployment of the software application on a second subset of one or more targets of the plurality of targets continue to run from the first set of components in the first container.

10. The one or more non-transitory computer-readable media of claim 9,
wherein instructions for generating the updated software binary for the updated version of the software application comprise instruction for applying a set of patches to the previous version of the software application; and
wherein the instructions further cause instructions comprising loading the updated software binary for the updated version of the software application to a plurality of virtual containers.

11. The one or more non-transitory computer-readable media of claim 9,
wherein the updated version of the software application is activated on a particular target in the first subset of one or more targets without copying private data created by the previous version of the software application; and
wherein the updated version of the software application uses the private data upon activation.

12. The one or more non-transitory computer-readable media of claim 9,
wherein the instructions, when executed, further cause operations comprising:
after activating the updated version of the software application on the first subset of one or more targets of the plurality of targets, activating the updated version of the software application on the second subset of one or more targets of the plurality of targets.

13. The one or more non-transitory computer-readable media of claim 9, further storing instructions which, when executed, cause operations comprising:
maintaining a maintenance window comprising a plurality of time slots;
for each respective time slot of two or more time slots of the plurality of time slots, registering at least one target from the plurality of targets with the respective time slot; and
wherein the updated version of the software application is activated on the at least one target at a time corresponding to the respective time slot with which the at least one target is registered.

14. The one or more non-transitory computer-readable media of claim 9, further storing instructions which, when executed, cause operations comprising:
activating the updated version of the software application on the first subset of one or more targets at a first scheduled time; and
in response to determining that activation of the updated version of the software application was unsuccessful for a threshold number of targets in the first subset of one or more targets preventing activation of the updated version of the software application on the second subset of one or more targets at a second scheduled time.

15. The one or more non-transitory computer-readable media of claim 9, wherein activating the updated version of the software application on the first subset of one or more targets is performed in response to at least one of (a) a determination that at least one particular target has fallen behind a standard version of the software application by a threshold number of updates; or (b) a determination that a threshold time has passed for switching to the updated version of the software application.

16. The one or more non-transitory computer-readable media of claim 9, wherein activating the updated version of the software application on the first subset of one or more targets comprises replacing a second software binary for the previous version of the software application with the updated software binary for the updated version of the software application and running a configuration action on the first subset of one or more targets.

17. A system comprising:
one or more hardware processors;
one or more non-transitory computer-readable media storing instructions, which, when executed by the one or more hardware processors cause operations comprising:
generating an updated software binary for an updated version of a software application that uses a virtual container as an executable directory;
wherein a previous version of the software application is deployed on a plurality of targets;
wherein the previous version of the software application runs from a first set of components in a first container referenced by the virtual container;
loading the updated software binary for the updated version of the software application to a second container that is referenced by the virtual container;
wherein the previous version of the software application remains active on the plurality of targets while the updated software binary for the updated version of the software application is loaded to the second container that is referenced by the virtual container;
wherein the virtual container is manageable as a single software unit representative of the software application that uses the virtual container as an executable directory, the virtual container defining a path for running the software application from the first set of components in the first container; and
activating the updated version of the software application on a first subset of one or more targets of the plurality of targets by changing the path defined by the virtual container to run at least one deployment of the software application from a second set of source components in the second container;
wherein after changing the path defined by the virtual container, at least one deployment of the software application on a second subset of one or more targets of the plurality of targets continue to run from the first set of components in the first container.

18. The system of claim 17,
wherein instructions for generating the updated software binary for the updated version of the software application comprise instruction for applying a set of patches to the previous version of the software application; and wherein the instructions further cause instructions comprising loading the updated software binary for the updated version of the software application to a plurality of virtual containers.

19. The system of claim 17, wherein the updated version of the software application is activated on a particular target in the first subset of one or more targets without copying private data created by the previous version of the software application; and wherein the updated version of the software application uses the private data upon activation.

20. The system of claim 17, wherein the instructions, when executed, further cause operations comprising:

after activating the updated version of the software application on the first subset of one or more targets of the plurality of targets, activating the updated version of the software application on the second subset of one or more targets of the plurality of targets.

\* \* \* \* \*